United States Patent [19]

Yamahata

[11] Patent Number: 5,247,639
[45] Date of Patent: Sep. 21, 1993

[54] MICROPROCESSOR HAVING CACHE BYPASS SIGNAL TERMINAL

[75] Inventor: Hitoshi Yamahata, Tokyo, Japan
[73] Assignee: NEC Corporation, Tokyo, Japan
[21] Appl. No.: 540,617
[22] Filed: Jun. 20, 1990

[30] Foreign Application Priority Data

Jun. 20, 1989 [JP] Japan .................. 1-158584

[51] Int. Cl.[5] .................. G06F 12/00; G06F 12/08; G06F 13/14; G06F 13/24
[52] U.S. Cl. .................. 395/425; 395/400; 364/DIG. 1
[58] Field of Search .................. 395/425, 400; 364/200 MS File, 243.43, 243.41

[56] References Cited

U.S. PATENT DOCUMENTS

| | | | |
|---|---|---|---|
| 4,075,686 | 2/1978 | Calle | 364/200 |
| 4,800,490 | 1/1990 | Tanaka et al. | 364/200 |
| 4,905,141 | 2/1990 | Brenza | 395/425 |
| 4,937,738 | 6/1990 | Uchiyama et al. | 364/200 |
| 4,942,518 | 9/1990 | Weatherford et al. | 364/200 |
| 4,959,777 | 9/1990 | Holman, Jr. | 364/200 |
| 5,101,489 | 3/1992 | Sato et al. | 395/425 |

FOREIGN PATENT DOCUMENTS

0173981 8/1985 European Pat. Off.

OTHER PUBLICATIONS

IBM Technical Disclosure Bulletin, vol. 25, No. 38, Aut. 1, 1982, pp. 1656-1657—Duke et al.

Primary Examiner—Alyssa H. Bowler
Attorney, Agent, or Firm—Foley & Lardner

[57] ABSTRACT

A microprocessor capable of being incorporated in an information processing system with a cache memory unit and capable of realizing fine cache bypass control. The microprocessor can detect data to be cache-bypassed without checking bus status signals. The microprocessor is equipped with a cache bypass signal generator. Upon detection of data to be bypassed, the cache bypass signal generator generates a cache bypass request signal, which prevents the cache memory from performing a data caching operation on the data.

16 Claims, 8 Drawing Sheets

FIG. 4A
Normal Read Bus Cycle

FIG. 4B
Cash Bypass Read Bus Cycle

MICROPROCESSOR HAVING CACHE BYPASS SIGNAL TERMINAL

BACKGROUND OF THE INVENTION

The present invention relates to a microprocessor and, more particularly, to a microprocessor suitable for being applied to an information processing system equipped with a cache memory unit.

As well known in the art, a cache memory unit is widely employed in an information processing system as one means of enhancing processing, speed and efficiency. However, the cache memory unit fetches all the data responsive to access requests from a microprocessor often resulting in a decrease in the processing efficiency. For example, peripheral I/O (Input/Output) devices are generally initiated in the state controls thereof in response to a data access bus cycle by the microprocessor. Hence, the data, which are read from or written into the peripheral I/O devices responsive to IN/OUT instructions, are not required to be fetched in the cache memory unit. If those data are fetched in the cache memory unit, however, some important data, which have already been stored in the cache memory unit, disappear therefrom. As another example, in the execution of STRING instructions, in which a string of data are transferred between the I/O device and a main memory or between two storage areas of the main memory, if the cache memory unit having small memory capacity is employed, it would be filled with the string of data thus transferred, so that the effective and important data also disappear therefrom.

Therefore, such data are required to bypass the cache memory unit without being fetched therein. For this purpose, the cache memory unit is constructed to have a cache bypass control terminal and to inhibit a data caching operation in the data access bus cycle when an active level is applied to the cache bypass control terminal.

The microprocessor produces a set of bus status signals simultaneously with the initiation of the data access bus cycle. The set of bus status, signals represents the kind of the data accesses. Accordingly, the level or signal to be applied to the cache bypass control terminal of the cache memory unit can be controlled by decoding the set of bus status signals.

However, the kinds of information represented by the bus status, signals are restricted. For this reason, a fine cache bypass control fitting to a recent information processing system employing a high performance microprocessor cannot be attained. In particular, a memory read access for setting a certain value into a privilege register in PRIVILEGE instructions and a task context data access in TASK SWITCHING instructions are not distinguished from the access bus cycles in normal instructions, such as a move instruction and an operation instruction by the content of the bus status signals. As a result, the privilege data and the task context data are fetched or stored in the cache memory unit, although the access frequency to such data is low.

SUMMARY OF THE INVENTION

Therefore, an object of the present invention is to provide a microprocessor equipped with a cache bypass signal generator for realizing a fine cache bypass control.

Another object of the present invention is to provide a microprocessor equipped with a cache bypass signal generator which detects data to be cache-bypassed without checking bus status signals and then generates a cache bypass request signal.

A microprocessor according to the present invention comprises an instruction decoder unit decoding an instruction to be executed and producing decoded instruction information and a data access request for instruction operand data, a bus control unit initiating a data access bus cycle in response to the data access request from the instruction decoder unit, and an instruction execution unit executing an instruction in response to the decoded instruction information and receiving and supplying data from and to the bus control unit, the instruction decoder unit includes a cache bypass request detector/generator which detects data to be accessed and cache-bypassed and generates a bypass request which is, in turn supplied to the bus control unit. When the cache bypass request is generated, the bus control unit produces a cache bypass command signal in synchronism, with the data access bus cycle.

The cache bypass command signal is supplied to a cache bypass control terminal of a cache memory unit to command the cache memory unit to inhibit a caching operation on data responsive to the data access bus cycle.

In the preferred embodiment of the present invention, the cache bypass request detector/generator receives information representative of the instruction which is currently subjected to the decoding operation. When that information represents IN or OUT instructions for peripheral I/O devices, or STRING instructions, or PRIVILEGE instructions, or TASK SWITCHING instructions, or SEMAPHORE DATA operation instructions for attaining the synchronism between microprocessors in multi-processor system, the cache bypass request is generated. Favorably, the cache bypass request detector/generator further receives information representative of the number of operand data, so that the generation of the cache bypass request can be further controlled in accordance with whether the operand data to be accessed is the first (source) operand or the second (destination) operand. It is convenient that a cache bypass request generator is also provided in the execution unit, which generates a cache bypass request when a data access request for fetching vector information for an interrupt operation and an exception operation is made to the bus control unit.

Thus, the microprocessor according to the present invention produces a cache bypass request (or command) signal by itself in order to perform a fine cache bypass control.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Figure 1:
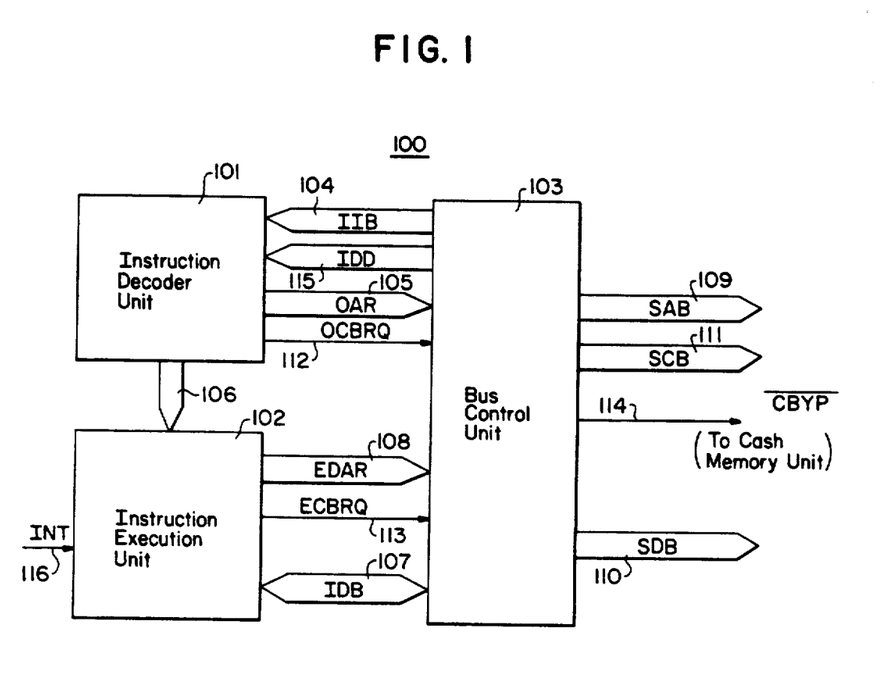
FIG. 1 is a block diagram representative of an embodiment of the present invention.

Referring to FIG. 1, a microprocessor 100 according to an embodiment of the present invention includes an instruction decoder unit 101, an instruction execution unit 102 and a bus control unit 103. The decoder unit 101 decodes an instruction transferred via an instruction bus (IIB) 104 from the bus control unit 103 and then issues an access request for instruction operand data to the bus control unit 103 by means of an operand access request bus 105. The decoder unit 101 further transfers decoded instruction information 106 to the execution unit 102. The execution unit 102 executes an instruction in response to the decoded instruction information 106 and receives or supplies operand data from or to the bus control unit 103 via an internal data bus (IDB) 107. The execution unit 102 further issues a data access request by means of an execution data access request bus 108 upon operations responsive to an interrupt request signal (INT) 116 or to an exception occurring during the instruction execution. The bus control unit 103 responds to the operand access request 105 or the execution data access request 108 and drives a system address bus (SAB) 109, a system data bus (SDB) 110, a system control bus (117) to perform data access bus cycles. For an operand access request using an indirect addressing, the bus control unit 103 performs the bus cycle for getting an indirect value necessary to the indirect addressing and then transfers that value to the decoder unit 101 via a bus (IDD) 115. Although not shown, a cache memory unit, a main memory and peripheral I/O devices are coupled to the system buses 109, 110 and 114. An information processing system is thus structured.

The instruction decoder unit 101 supplies a cache bypass request signal (QCBRQ) 112 to the bus control unit 103 when operand data to be accessed are to be cache-bypassed. The execution unit 102 also supplies a cache bypass request signal (ECBRQ) 113 to the bus control unit 103 when execution data to be accessed are to be cache-bypassed. When the bus control unit 103 receives the data access request 105 or 108 together with the cache bypass request 112 or 113, it produces a cache bypass signal (CBYP) 114 of an active level (a low level in this embodiment) in synchronism with the initiation of the bus cycle for accessing the requested operand or, execution data. This signal 114 is supplied to a cache bypass control terminal of the cache memory unit. Consequently, the cache memory unit inhibits the data caching operation. The accessed data thereby bypasses the cache memory unit without being fetched therein.

Figure 2:
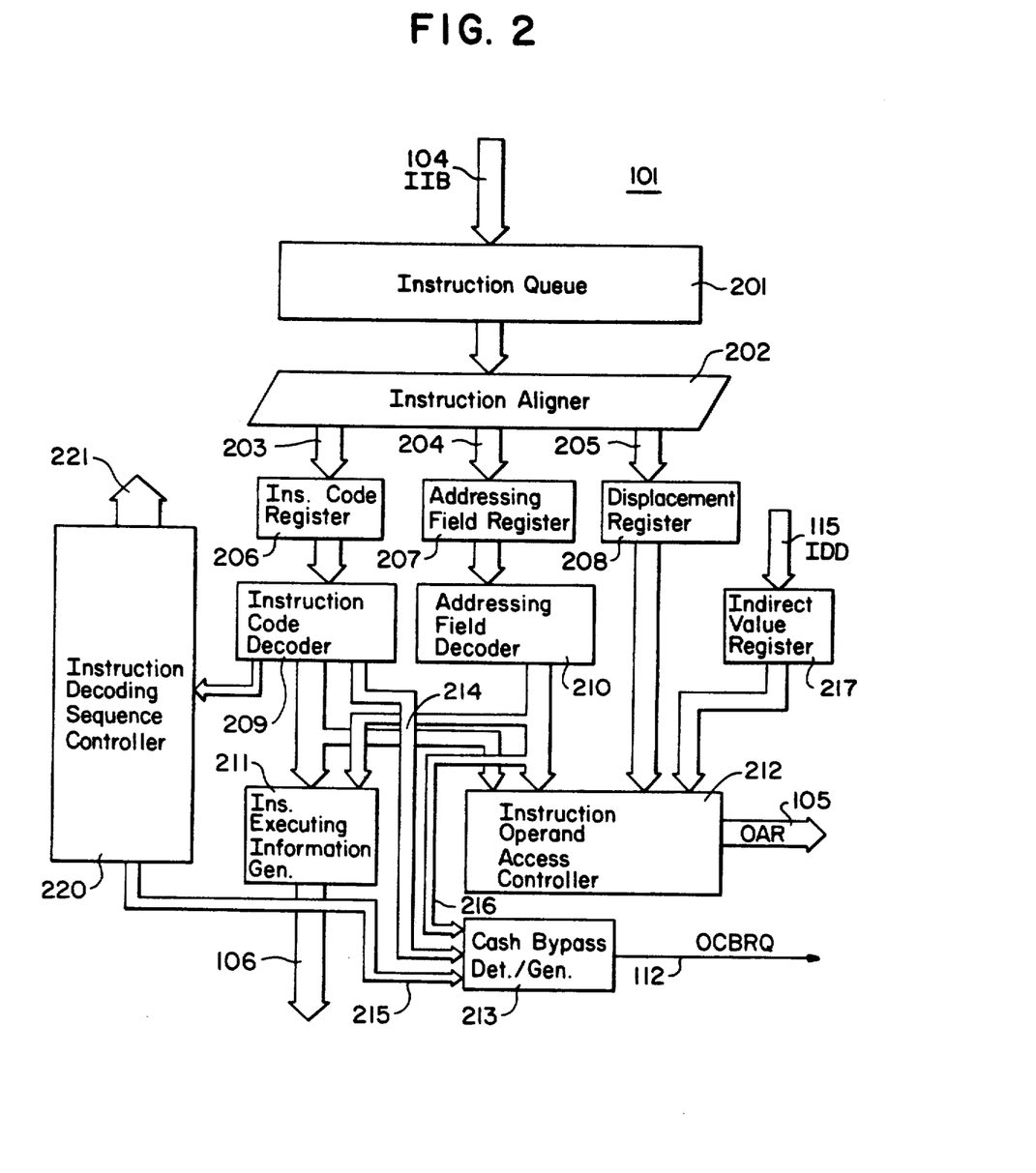
FIG. 2 is a block diagram representative of an internal construction of an instruction decoder unit shown in FIG. 1.

Turning to FIG. 2, the instruction decoder 101 includes an instruction queue 201 for temporarily storing instructions transferred via the bus 104 from the bus control unit 103. The instruction read out of the queue 201 is divided by an instruction aligner into an instruction code 203, an addressing field 204 and a displacement data field 205 which are then stored in an instruction code register 206, an addressing field register 207 and a displacement register 208, respectively. The indirect value from the bus 115 is stored in a register 217. An instruction code decoder 209 decodes the instruction code from the register 206 and an addressing field decoder 210 decodes the addressing field from the register 207. In response to decoded data from the decoders 209 and 210, an instruction execution information generator 211 generates the decoded instruction information 106 to be transferred to the execution unit 102. An instruction operand access controller 212 creates the instruction operand access information and then transfers it onto the bus 105 in response to the decoded information from the decoders 209 and 210 and the displacement data from the register 208 and/or the indirect value from the register 217. The above registers, decoders and controllers are controlled by an instruction decoding sequence controller 220 to perform predetermined decoding sequence operations.

The cache bypass request signal 112 is generated by a cache bypass detector/generator 213. This detector/generator 213 is supplied from the instruction code decoder 209 with first information 214 indicative of the kind of instructions subjected to the decoding operation. In the present embodiment, as instructions in which operand data is to be cache-bypassed, IN and OUT instructions for peripheral I/O devices, STRING instructions, PRIVILEGE instruction, TASK SWITCHING instructions, and SEMAPHORE DATA OPERATION instructions are selected. These instructions are allocated respectively with identifying codes consisting of a few bits, and the identifying code corresponding to the decoded instructions is supplied to the detector/generator 213 as the information 214. When other instructions such as a data move instruction and a data operation instruction (called hereinafter "normal" instructions) are decoded, a code indicative of the normal instructions is supplied to the detector/generator 213 as the first information 214. The detector/generator 213 is further supplied from the sequence controller 220 with second information 215 indicative of an operand number. By this information 215, the detector/generator 213 detects whether the operand data, an access request for which is issued by the operand access controller 212, is the first operand (i.e., a source operand) or the second operand (i.e., a destination operand). Accordingly, the detector/generator 213 can further control the level of the cache bypass request signal 112 in accordance with the first (source) or second (destination) operand. The indirect addressing is often used for accessing operand data and hence the indirect value used in the indirect addressing is preferably fetched in the cache memory unit. To this end, the cache bypass detector/generator 213 is further supplied by the addressing field decoder 210 with third information 216 indicative of the current data access request for fetching the indirect value used in the indirect addressing. When the detector/generator 213 receives the third information 216, it changes the cache bypass request signal 112 to the inactive level (the low level) irrespective of the contents of the first and second information 214 and 215, respectively.

Thus, the first, second and third cache bypass detector/generator 213 responds to the information 214, 215 and 216, respectively, and controls the level of the cache bypass request signal 112 in accordance with the following table:

TABLE $$OCBRQ\ 112 \begin{pmatrix} H - Active \\ L - Inactive \end{pmatrix}$$

| Instruction | First (Source Operand) | Second (Destination Operand) |
|---|---|---|
| IN | L | H |
| OUT | H | L |
| STRING | H | H |
| PRIVILEGE | H | H |
| TASK SWITCH | H | H |
| SEMAPHORE | H | H |
| Normal | L | L |

More specifically, the cache bypass request signal 112 takes the active high level when the operand access controller 212 issues the source operand access request in IN instruction and the destination operand access request in the OUT instruction. The destination operand data in the IN instruction and the source operand data in the OUT instruction are advantageous to be fetched in, the cache memory unit since they are often used in the subsequent data processing operation, and therefore the cache bypass request signal 112 is changed to the inactive (low) level. In the STRING, PRIVILEGE, TASK SWITCH and SEMAPHORE instructions, the cache bypass request signal 112 takes the active high level in both the source and destination operand access requests. Although not shown in TABLE above, the cache bypass request signal takes the inactive level in the access request for fetching the indirect value used in the indirect addressing, as mentioned hereinbefore. The cache bypass detector/generator 213 may be constructed by PLA (Programmable Logic Array) and/or random logic gates.

Thus, a fine cache bypass control is performed in accordance with the kind of instructions and the kind of operand data.

Figure 3:
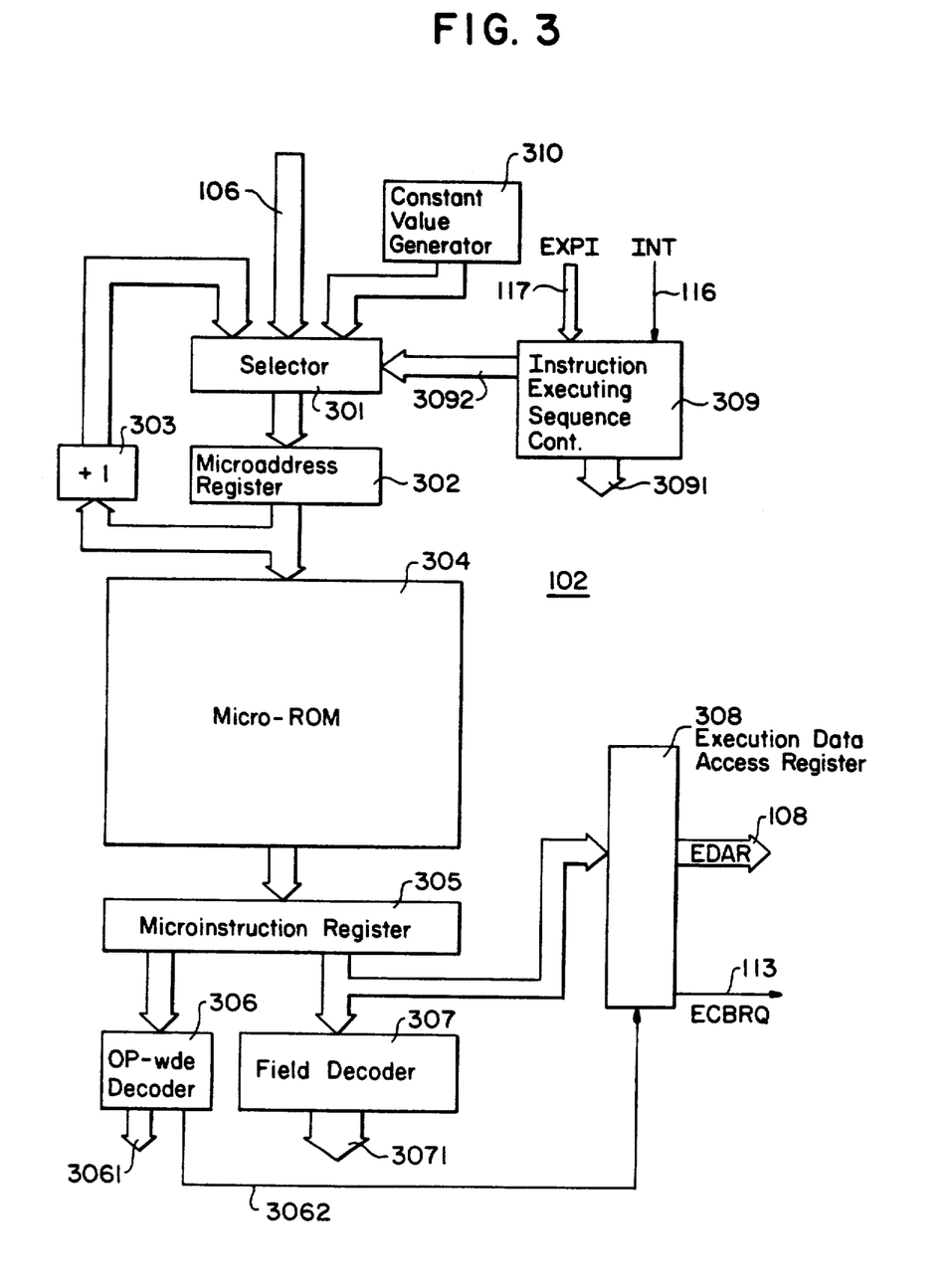
FIG. 3 is a block diagram representative of an internal construction of an instruction execution unit shown in FIG. 1.

Referring to FIG. 3, there is shown an internal construction of the instruction execution unit 102. It is noted that only parts related to the present invention are shown in this drawing. The execution unit 102 employs a microprogram control technique. That is, an instruction to be executed is executed by performing a microprogram consisting of a string of microinstructions. The leading address information of the microprogram, which is denoted by 106' and contained in the decoded instruction information 106, is thus loaded to a microaddress register 302 via a selector 301 to read a microinstruction from a microprogram memory (micro-ROM) 304. The read-out microinstruction is latched in a microinstruction register 305. A decoder 306 decodes an operation code of the microinstruction and then generates execution control information 3061. The other field of the microinstruction is decoded by a field decoder 307, so that corresponding control information 3071 is generated. Unless an interrupt request, exception operation request and branch request are generated, the content of the register 302 is incremented by one by an incrementer 303 and the incremented content is restored to the register 302 via the selector 301. As a result, a next microinstruction is read out of the micro-ROM 304 and then executed. The above registers and decoders are controlled by an instruction execution sequence controller 309 with sequence information 3091 and selecting information 3092.

When the interrupt request signal (INT) 116 or the exception operation request (EXPI) 117 responsive to the occurrence of the execution exception if generated, the sequence controller 309 commands the selector 301 to select a constant generator 310 by use of the selecting information 3092. The constant generator 310 generates the leading address information of a microprogram for initiating an operation for the interrupt request or the exception occurrence, and that leading address information is loaded to the register 302 via the selector 301. Consider that a microinstruction is stored in the register 305 in order to fetch vector information used for performing the interrupt or exception operation. Since the operation code of this microinstruction indicates that the remaining field thereof is used as access information for fetching the vector information, the decoder 306 generates a register load signal 3062 to load the remaining field into an execution data access request register 308. This field includes a bit corresponding to the cache bypass request signal 113 and this bit is set to "1" (the high level). Therefore, the execution unit 102 issues the execution data access request 108 with the cache bypass request signal 113 being in the active high level.

Figure 4A:
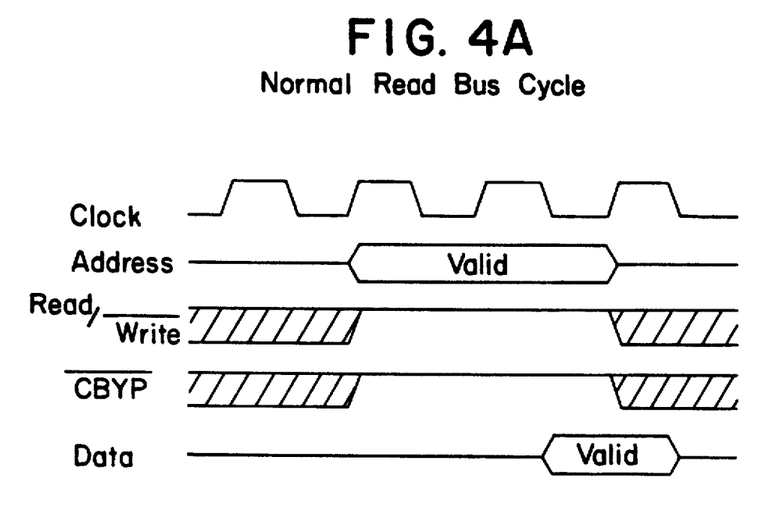
FIGS. 4A and 4B are timing charts representative of a normal read bus cycle and a cache bypass read bus cycle, respectively.
Figure 4B:
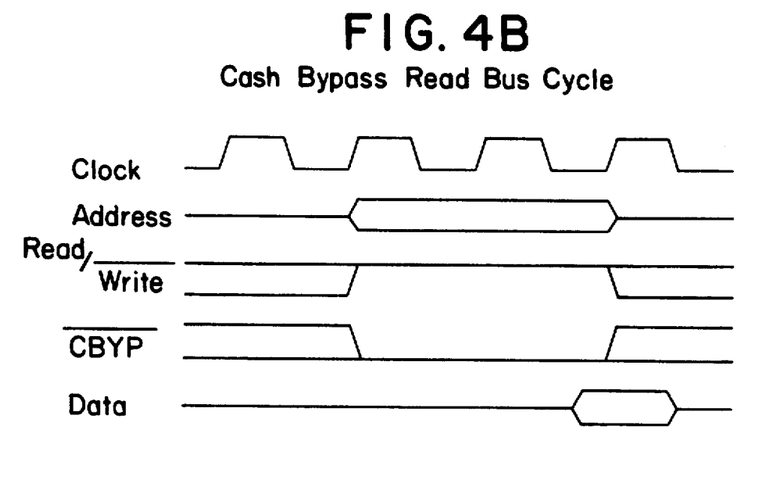

The bus control unit 103, when receiving a cache bypass access request, wherein the data access request is issued with the cache bypass request signal 112 or 113 being in the active high level, performs a data access bus cycle with changing the cache bypass signal ($\overline{CBYP}$) 114 to the active low level, as shown in FIG. 4B. The accessed data is thereby not fetched into the cache memory unit. On the other hand, when the bus control unit 103 receives a normal data access request in which the cache bypass request signal 112 or 113 is in the inactive level, it performs a data access bus cycle with changing the cache bypass signal ($\overline{CBYP}$) 114 to the inactive level, as shown in FIG. 4A. It is noted that the bus cycles shown in FIGS. 4A and 4B represent a read bus cycle. In case of a write bus cycle, a read/write signal is changed to the low level.

Figure 5:
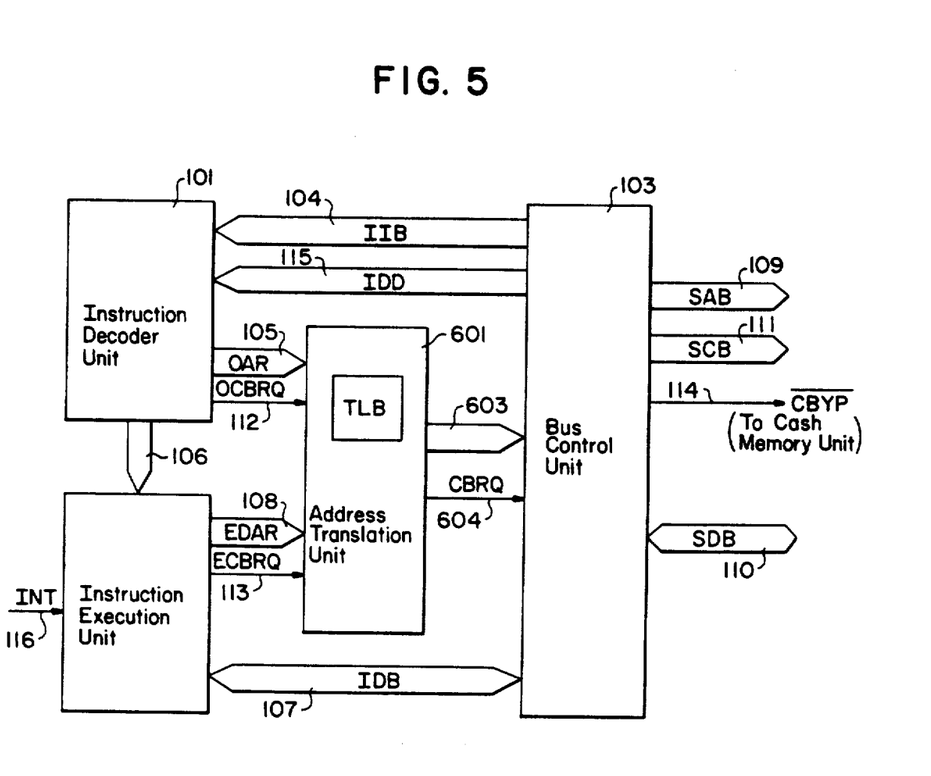
FIG. 5 is a block diagram representative of another embodiment of the present invention.

Turning to FIG. 5, there is shown another embodiment according to the present invention, in which the same constituents as those shown in FIG. 1 are denoted by the same reference numerals to omit the further description thereof. The microprocessor according to this embodiment further includes an address translation unit 601 having TLB (Translation Look aside Buffer) 602 and thus employing a virtual memory management method.

Figure 6:
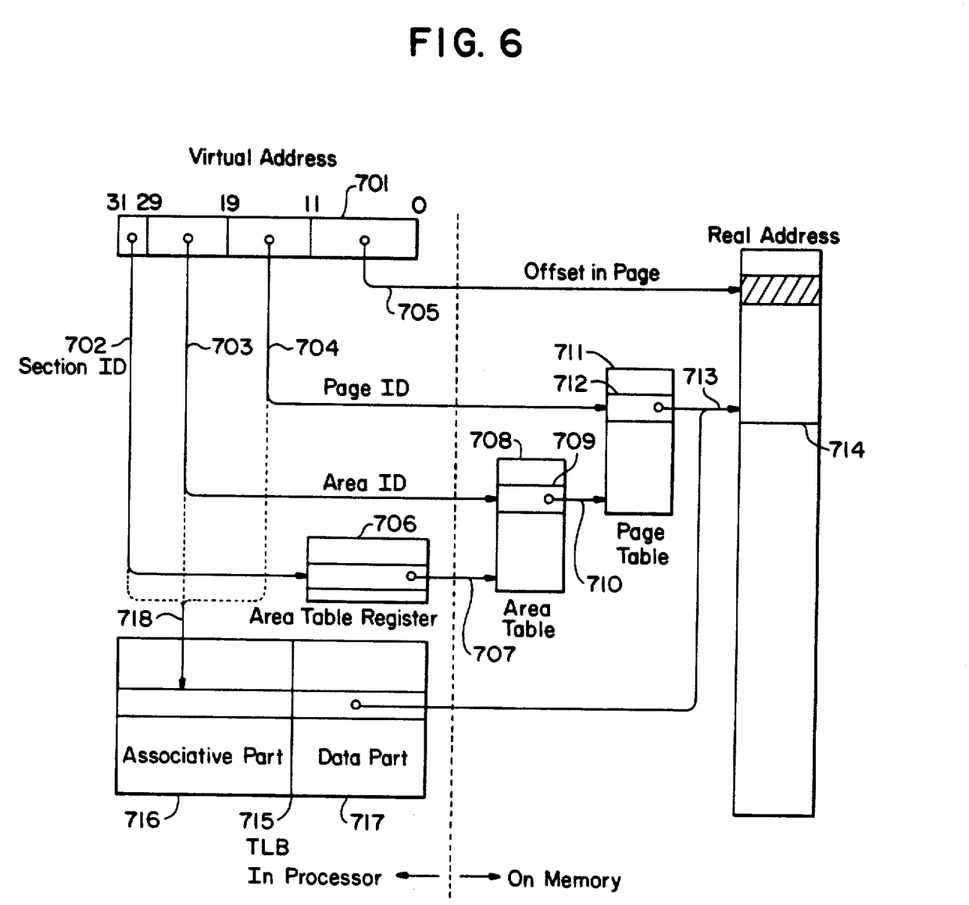
FIG. 6 is an operation diagram representative of an address translation unit shown in FIG. 5.

The translation from a virtual address to a real address is performed in accordance with an operation flow shown in FIG. 6. More specifically, a virtual address of a 32-bit length is divided, from the most significant bit (MSB) toward the least significant bit (LSB), 2-bit section ID 702, 10-bit area ID 703, 8-bit page ID 704 and 12-bit offset in page 705. In a translation operation, a register in an area table register 706 provided in the microprocessor is first selected by the content of the section ID 702. An area table base address 707 is thereby read out of the selected register. By using this base address 707 and the area ID 703, an area table entry (ATE) 709 is then selected from an area table 708. The selected ATE 709 has a page table base address 710.

Next, a page table entry (PTE) 712 is selected from a page table 711 by use of the page table base address 710 and the page ID 704. The PTE has a real page number 713 which selects one page 714 of the memory map or space. Finally, a real address is obtained by adding the selected page 714 and the content of the offset in page 705. The translation from the virtual address to the real address is thus performed, and the translated result is temporarily stored in TLB 715 which corresponds to TLB 602 of FIG. 5. That is, the more significant 20-bit information of the virtual address 701 is stored in an associative part 716 of TLB 715, and the real page number 713 as well as memory management information such as protection information are stored in a data part 717 of TLB 715. Further, a TLB entry is changed to a valid state. When the virtual address 701 is required to be translated, the more significant 20-bit 718 of the address 701 is compared with the content of the associative part 716 having the valid TLB entry. Upon coincidence, the real page number 713 is read out of the data part 717 and then added with the offset in page 705 to produce the real address.

Figure 7:
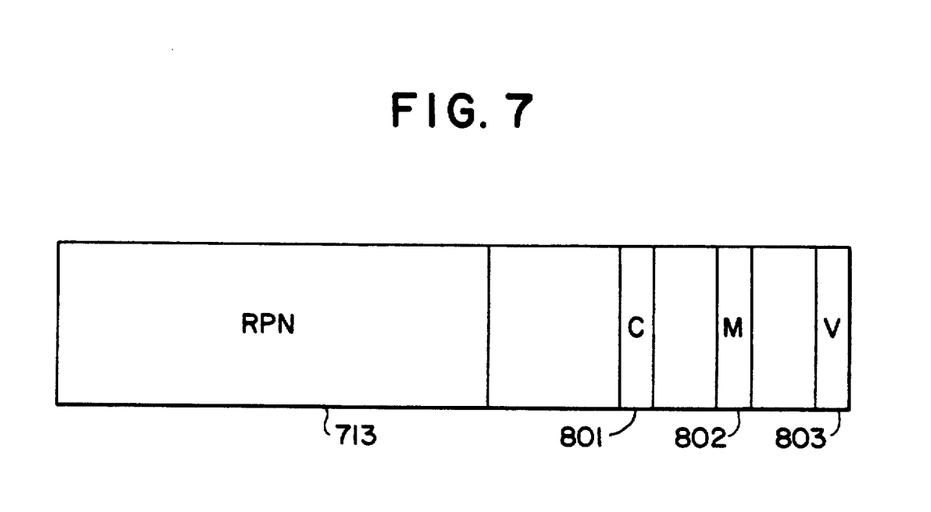
FIG. 7 is a data format diagram representative of a page table entry shown in FIG. 6.

Turning to FIG. 7, the content of the page table entry 712 is shown and has the real page number (RPN) 713, a cache bypass bit 801, a modifying bit 802, a valid bit 803 and memory management information consisting of several bits. The valid bit 803 is used to indicate whether or not the page table entry 712 is valid, and the modifying bit 802 is used to indicate whether or not a data write operation is carried out in the page designated by the page table entry 712. The cache bypass bit 801 is provided in accordance with the present invention and is used to indicate whether or not the data access to the page designated by the page table entry 712 is cache bypassed.

Figure 8:
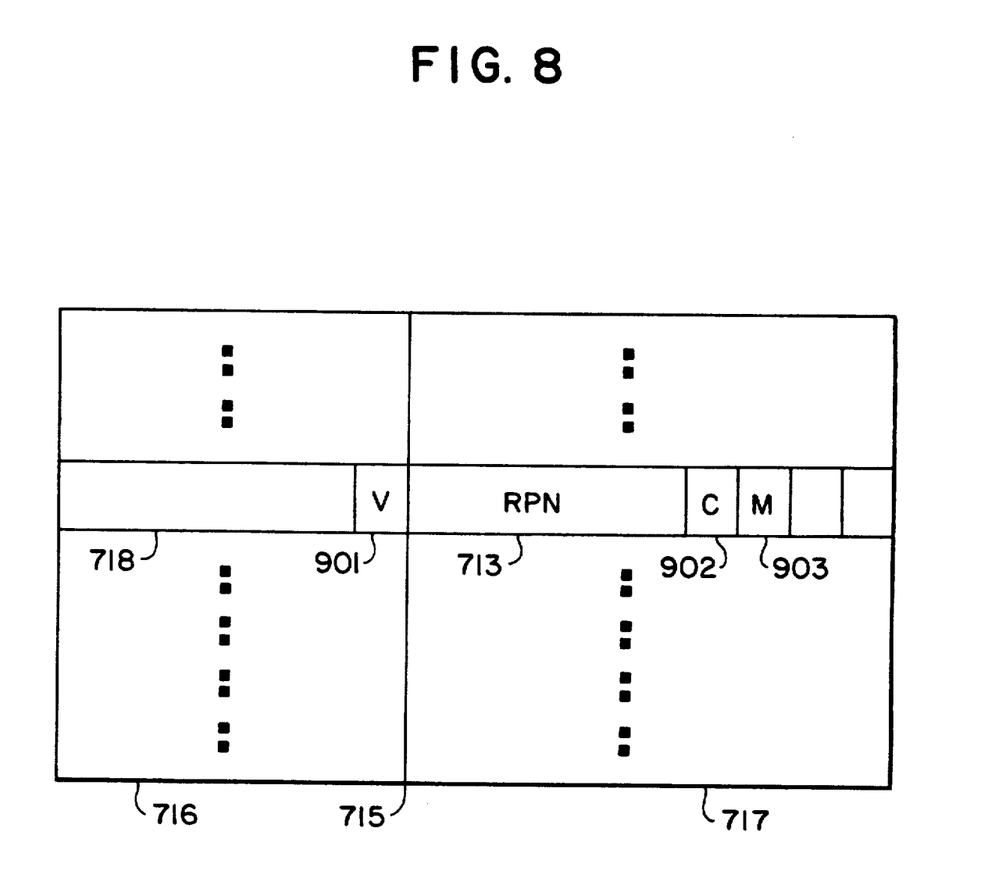
FIG. 8 is a data format diagram representative of contents of TLB (Translation Look aside Buffer) shown in FIG. 6.

Referring to FIG. 8, the TLB 715 consists of the associative part 716 and the data part 717. The associative part 716 stores the more significant 20 bits 718 of the virtual address 701 and has the TLB entry bit 901 which is set to the valid state when the data of the above 20 bits 718 is stored therein. The data part 717 stores the real page number 713, the cache bypass bit 902, the modifying bit 903 and other information.

Figure 9:
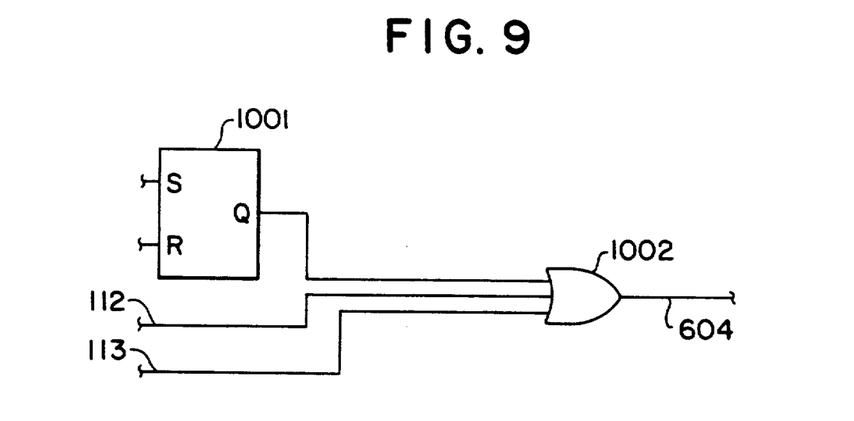
FIG. 9 is a circuit diagram representative of a circuit for generating a cache bypass request signal included in the address translation unit shown in FIG. 5.

In operation, the instruction decoder unit 101 decodes an instruction and then generates the operand data access request 105 including a virtual operand address and other information such as the types of accesses. The virtual operand address is translated to the real address by the address translation unit 601, as described hereinbefore with reference to FIG. 6. The content of the cache bypass bit 801 in the page table entry 712 thus derived is latched in a page bypass flip-flop 1001 shown in FIG. 9. The content of the bit 801 is further registered in the TLB 602 as the bit 902. The output of the flip-flop 1001 is ORed, by an OR gate 1002 together with the operand data cache bypass request signal 112 and the execution data cache bypass request signal 113, and the output of the OR gate 1002 is supplied to the bus control unit 103 as a data cache bypass request signal 604. The translated real address is transferred along with other access information to the bus control unit 103 as bus access information 603. When the TLB 602 is used for the address translation, the cache bypass bit 902 of the data part 717 is latched in the flip-flop 1001.

Thus, according to the present embodiment, the cache bypass control is also performed by the page table 713, and therefore the cache bypass data access can be designated to desired page or pages on the memory space independently of the kind of instructions and operands.

The present invention is not limited to the above embodiments, but may be modified and changed without departing from the scope and spirit of the invention.

For example, since the vector information for the interrupt operation and the exception operation is a relatively small amount of data, the cache bypass request signal 113 from the execution unit 102 may be omitted. An internal cache memory unit can be incorporated in the microprocessor, and in that the cache bypass signal 114 is supplied to both the internal and external cache memory units.

What is claimed is:

1. A microprocessor employed in an information processing system including a cache memory unit, comprising:
    an instruction decoder unit for decoding an instruction to be executed and for generating decoded instruction information and a data access request for an instruction operand;
    a bus control unit for performing a data access bus cycle in response to said data access request from said instruction decoder unit; and
    an instruction execution unit for executing said instruction in response to said decoded instruction information from said instruction decoder unit and for receiving data from and supplying data to said bus control unit;
    said instruction decoder unit including cache bypass request generating means for generating a cache bypass request whenever data, for which said access request is to be generated, are of a predetermined kind,
    said bus control unit including cache bypass command signal generating means responsive to said cache bypass request for generating a cache bypass command signal in synchronism with said data access bus cycle, said cache bypass command signal being supplied to said cache memory unit to cause said cache memory unit to inhibit a data caching operation on data responsive to said data access bus cycle,
    said cache bypass request generating means receiving first information representative of the instruction decoded by said instruction decoding unit and second information representative of a number of instruction operands to be accessed and generating said cache bypass request in response to contents of said first and second information, and
    said cache bypass request generating means further receiving third information representative of an addressing method, and when said addressing method indicates an indirect addressing, said cache bypass request generating means withdrawing said cache bypass request irrespective of the contents of said first and second information.

2. A microprocess employed in an information processing system including a cache memory unit, comprising:
    an instruction decoder unit for decoding an instruction to be executed and for generating decoded instruction information and a data access request for an instruction operand;
    a bus control unit for performing a data access bus cycle in response to said data access request from said instruction decoder unit; and an instruction execution unit for executing said instruction in response to said decoded instruction information from said instruction decoder unit and for receiving data from and supplying data to said bus control unit, said instruction decoder unit including cache bypass request generating means for generating a first cache bypass request whenever data, for which said data access request is to be generated, are of a predetermined kind, said bus control unit including cache bypass command signal generating means responsive to said first cache bypass request for generating a cache bypass command signal in synchronism with said data access bus cycle, said cache bypass command signal being supplied to said cache memory unit to cause said cache memory unit to inhibit a data caching operation on data responsive to said data access bus cycle, said instruction execution unit includes:
- a microprogram memory for storing microinstructions;
- means responsive to said decoded instruction information for reading out a string of microinstructions from said microprogram memory to execute said instructions;
- means responsive to at least one of an interrupt request and an exception operation request for reading out a predetermined microinstruction from said microprogram memory, said predetermined microinstruction causing said bus control unit to perform a data access bus cycle for accessing data needed for said at least one of said interrupt request and said exception operation request; and
- means for generating a second cache bypass request in response to said predetermined microinstruction, said cache bypass command signal generating means further generating said cache bypass command signal in response to said second cache bypass request.

3. A microprocessor employed in an information processing system including a cache memory unit, comprising:

and instruction decoder unit for decoding an instruction to be executed and for generating decoded instruction information and a data access request for an instruction operand;

address translation unit for translating a virtual address contained in said data access request from said instruction decoder unit to a real address by use of a translation look aside buffer, said translation look aside buffer including a cache bypass bit area for temporarily storing cache bypass information indicative of whether or not a cache bypass is necessary, said address translation unit including means for generating a first cache bypass request whenever said cache bypass information indicates that said cache bypass is necessary;

a bus control unit for performing a data access bus cycle by use of said read address from said address translation unit; and an instruction execution unit for executing said instruction in response to said decided instruction information from said instruction decoder unit and for receiving data from and supplying data to said bus control unit;

said instruction decoder unit including cache bypass request generating means, responsive to said instruction to be executed being of a predetermined kind, for generating a second cache bypass request while said data access request is being generated, said cache request generating means not generating said second cache bypass request even though said instruction to be executed is of said predetermined kind when data accessed by said data access request represents indirect data used for an indirect addressing;

said bus control unit including means responsive to any one of said first and second cache requests for generating a cache bypass command signal in synchronism with said data access cycle, said cache bypass command signal being supplied to said cache memory unit to cause said cache memory unit to inhibit a data caching operation on data responsive to said data access bus cycle.

4. A microprocessor employed in an information processing system with a cache memory unit, comprising:

instruction decoder means for decoding an instruction to be executed and for generating decoded instruction information and a data access request for an instruction operand, said data access request containing a virtual address;

address translation means, including translation look aside buffer means, for translating said virtual address contained in said data access request into a real address by use of said translation look aside buffer means, said translation look aside buffer means including a cache bypass bit area for temporarily storing cache bypass information indicative of whether or not a cache bypass is necessary, said address translation means thereby producing said real address and said cache bypass information accompanied therewith;

bus control means for performing a data access bus cycle responsive to said data access request by use of said read address produced by said address translation means;

instruction execution means for executing said instruction in response to said decoded instruction information, and for transferring data to and from said bus control means;

cache bypass request generating means responsive to said cache bypass information produced by said address translation means for generating a cache bypass request when said cache bypass information indicates that said cache bypass is necessary; and cache bypass command signal generating means responsive to said cache bypass request for generating a cache bypass command signal in synchronism with said data access bus cycle for supplying said cache memory unit with said cache bypass command signal, thereby inhibiting a data caching operation on data responsive to said data access bus cycle.

5. The microprocessor as claimed in claim 4, wherein said instruction decoder means further includes instruction aligner means for dividing said instruction into an instruction code, an addressing field and a displacement data field.

6. The microprocessor as claimed in claim 5, wherein said instruction decoder means further includes an instruction code register, an addressing field register and a displacement register for storing said instruction code, addressing field and displacement data field, respectively.

7. The microprocessor as claimed in claim 5, wherein said instruction decoder means further includes instruction code decoding means for decoding said instruction code.

8. The microprocessor as claimed in claim 5, wherein said instruction decoder means further includes addressing field decoding means for decoding said addressing field.

9. The microprocessor as claimed in claim 5, wherein said instruction decoder means further includes instruction code decoding means for decoding said instruction code: and
   addressing field decoding means for decoding said addressing field.

10. The microprocessor as claimed in claim 9, wherein said instruction decoder means further includes instruction operand access controller means, responsive to said instruction code decoding means and said addressing field decoding means, for generating instruction operand access information and transferring said instruction operand access information to said bus control means.

11. A method for obtaining a fine cache bypass control using a microprocessor employed in an information processing system with a cache memory unit, comprising the steps of:
   decoding an instruction to be executed;
   generating decoded instruction information and a data access request for an instruction operand;
   translating a virtual address contained in said data access request into a real address by use of a translation look aside buffer which further stores cache bypass information indicating whether or not a cache bypass is required;
   performing a data access bus cycle in response to said data access request using a bus control unit and said real address;
   executing said instruction in response to said decoded instruction information;
   transferring data to and from said bus control unit;
   generating a first cache bypass request whenever data corresponding to said data access request are of a predetermined type;
   generating responsive to said cache bypass information a second cache bypass request when said cache bypass information indicates that said cache bypass is required;
   generating responsive to any one of said first and second cache bypass request a cache bypass command signal in synchronism with said data access bus cycle; and
   supplying said cache memory unit with said cache bypass command signal thereby inhibiting a data caching operation on data responsive to said data access bus cycle.

12. The method of obtaining fine cache bypass control as claimed in claim 11, wherein said step of generating a first cache bypass request includes generating a first cache bypass request whenever data corresponding to said data access request comprise STRING instructions.

13. The method of obtaining fine cache bypass control as claimed in claim 11, wherein said step of generating a first cache bypass request includes generating a first cache bypass request whenever data corresponding to said data access request comprise PRIVILEGE instructions.

14. The method of obtaining fine cache bypass control as claimed in claim 11, wherein said step of generating a first cache bypass request includes generating a first cache bypass request whenever data corresponding to said data access request comprise TASK SWITCH instructions.

15. The method of obtaining fine cache bypass control as claimed in claim 11, wherein said step of generating a first cache bypass request includes generating a first cache bypass request whenever data corresponding to said data access request comprise SEMAPHORE instructions.

16. The method of obtaining fine cache bypass control as claimed in claim 11, wherein said step of generating a first cache bypass request includes generating a first cache bypass request whenever data corresponding to said data access request comprise I/O instructions.

* * * * *